United States Patent [19]

Gronemeyer

[11] Patent Number: 5,450,573
[45] Date of Patent: Sep. 12, 1995

[54] DEVICE FOR MONITORING THE FUNCTIONING OF EXTERNAL SYNCHRONIZATION MODULES IN A MULTICOMPUTER SYSTEM

[75] Inventor: Michael Gronemeyer, Weddel, Germany

[73] Assignee: Siemens Aktiengesellschaft, München, Germany

[21] Appl. No.: 975,545

[22] PCT Filed: Jun. 3, 1991

[86] PCT No.: PCT/EP91/01020

§ 371 Date: Apr. 6, 1993

§ 102(e) Date: Apr. 6, 1993

[87] PCT Pub. No.: WO92/03785

PCT Pub. Date: Mar. 5, 1992

[30] Foreign Application Priority Data

Aug. 14, 1990 [EP]  European Pat. Off. ............ 90115583

[51] Int. Cl.⁶ ..................... G06F 11/16; G06F 11/20
[52] U.S. Cl. ..................... 395/550; 364/200; 364/228.3; 364/268.1; 364/268.3; 364/268.9; 364/269; 364/DIG. 1; 395/200.19
[58] Field of Search ............... 364/200; 395/575, 750, 395/550; 371/11; 340/175.5

[56] References Cited

U.S. PATENT DOCUMENTS

| | | | |
|---|---|---|---|
| 3,921,149 | 11/1975 | Kreis et al. | 340/175.5 |
| 4,377,000 | 3/1983 | Staab | 371/11 |
| 4,589,066 | 5/1986 | Lam et al. | 364/200 |
| 4,733,353 | 3/1988 | Jaswa | 364/200 |
| 4,965,717 | 10/1990 | Cutts et al. | 364/200 |
| 5,146,589 | 9/1992 | Peet, Jr. et al. | 395/575 |
| 5,193,175 | 3/1993 | Cutts et al. | 395/575 |
| 5,295,258 | 3/1994 | Jewett et al. | 395/575 |
| 5,317,752 | 5/1994 | Jewett et al. | 395/750 |
| 5,327,553 | 7/1994 | Jewett et al. | 395/575 |

FOREIGN PATENT DOCUMENTS

| | | |
|---|---|---|
| 0172569 | 2/1986 | European Pat. Off. . |
| 1269827 | 6/1968 | Germany . |
| 2155159 | 7/1973 | Germany . |
| 1952926 | 12/1975 | Germany . |
| 2458224 | 6/1976 | Germany . |
| 2413401 | 6/1978 | Germany . |
| 3431169 | 3/1986 | Germany . |
| WO85/05707 | 12/1985 | WIPO . |

Primary Examiner—Kevin A. Kriess
Assistant Examiner—Majid A. Banankhah
Attorney, Agent, or Firm—Kenyon & Kenyon

[57] ABSTRACT

As soon as the computers of a two-out-of-three computer system arrive in their program run at a synchronization point, they interrupt the execution of the program run and transmit synchronization-readiness signals to the partner computers. The program run is continued at the same time in all computers, when synchronization-readiness signals from all three computers are present in these allocated synchronization modules. If a synchronization-readiness signal fails to appear, then this is detected by a time monitoring device of the synchronization module allocated to the computer which has become unsynchronized. After its established time span has expired, this synchronization module stops the computer from accessing the interface system relevant to security and transmits pseudo-synchronization-readiness signals to the other computers, which permanently simulate the synchronization capability of the failed computer there. The computer system then continues to work in the two-out-of-two mode. Should the time monitoring device fail, the time monitoring devices, which are adjusted to longer delay times, become effective in all synchronization modules and disconnect the computer system.

17 Claims, 1 Drawing Sheet

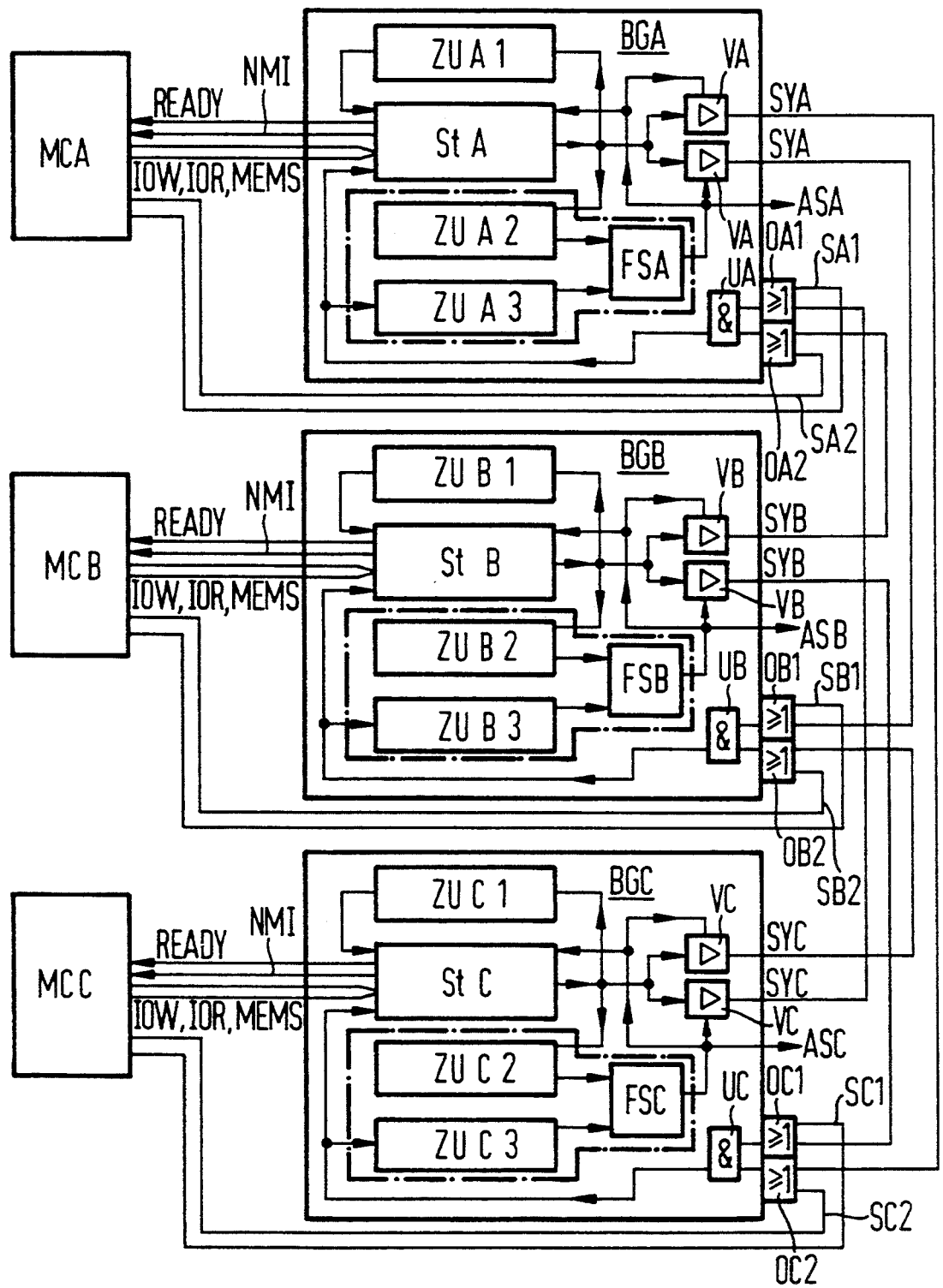

DEVICE FOR MONITORING THE FUNCTIONING OF EXTERNAL SYNCHRONIZATION MODULES IN A MULTICOMPUTER SYSTEM

BACKGROUND OF THE INVENTION

The present invention relates generally to devices for monitoring the synchronization in a multicomputer system having parallel-working individual computers, and more particularly to such a device that evaluates the time between synchronization-readiness signals, which are produced by the various computers of the multicomputer system or their synchronization modules and which signals indicate the attainment of a specified synchronization point, and to such a device that severs a computer, which does not output its synchronization-readiness signal within a specified time span after receiving the synchronization-readiness signals from the other computers. Such a device is disclosed by the German Provisional Patent 12 698 27.

Data flow among computers must be synchronized from time to time, especially in those multicomputer systems, in which the individual computers have separate clock-pulse generators and must exchange data among themselves. This is particularly necessary in situations where the number of computers is increased for security and reliability reasons and, in some instances for availability reasons, and where the computers continually compare themselves to one another to check for conformity in order to detect malfunctions. Computers also have to be synchronized when data (e.g., messages and commands) are simultaneously input via external interrupts. The maximum permissible time spans, within which a mutual synchronization must take place, depend essentially upon the clock frequency of the computer-clock-pulse generators and upon the accuracy of these clock-pulse generators.

German Provisional Patent 19 52 926 discloses a method for synchronizing two parallel-working data processing units, one of which is active and the other of which constitutes a reserve unit. The active unit in each case generates synchronizing signals in periodic intervals. These signals serve in the reserve unit to phase lock the clock-pulse generator there to the phase position of the clock signals from the controlling unit. This known method is not suited for multicomputer systems that have several controlling computers due to the unpredictable manner in which the computer emitting the synchronizing signals influences the data processing of the other computers, when correcting their clock-pulse generators.

German Provisional Patent 21 55 159 discloses an arrangement for synchronizing a multitude of computers in a computer system, in which the individual computers are mutually synchronized by having the computer that is the first to reach a synchronization point anchored in its program transmit a synchronization signal via a common line shared by all the computers to the remaining computers. This synchronization signal is stored in the remaining computers for a certain length of time. It blocks the synchronization signals generated there within the remaining computers themselves, and activates a pulse-generating circuit, by means of which a counter for clock signals is forced into the same switch position to which the corresponding counter of the fastest computer had been switched. This completes the synchronization process. In the case of this known configuration for synchronizing the computers of a multicomputer system, the failure of one computer, or rather of the circuit elements allocated to this computer for synchronization purposes, is not detected. Additionally, this known configuration fails to verify whether or not the computer actually assumes the specified switch position in the slower-running computers.

German Provisional Patent 24 13 401 discloses a device for synchronizing a two-out-of-three computer system, in which the processing of a new command is made dependent upon at least two of the three computers having established completion of the preceding command. Time-delay elements assure that the slowest computer at the time is able to complete the execution of commands and then simultaneously begin, together with the other computers, with the processing of the following command. If the slowest computer is not able to do this, it falls out of step, and is unable to synchronize itself. The computer system as such remains operational then as a two-out-of-two system. This device is unable to determine that one of the computers has failed because it is unable to be synchronized with the other computers; hence, no troubleshooting operation is launched. Thus, the failure of a second computer causes the computer system to become non-operational.

German Provisional Patent 12 698 27 discloses a method and a device for synchronizing two parallel-working data processing systems, in which the synchronization signals generated by the two data-processing devices are monitored in a timer supervision routine to verify that they do not run too far apart. If they are running apart to an unacceptable degree, however, then a program interrupt occurs due to a timing error. If the two synchronization signals exist within the maximum time duration specified by the timer supervision, then they initiate a synchronization routine in both individual computers through an AND operation. Since the timer supervision is not supposed to respond during the running operation, its performance must be verified by test programs to ensure that it is actually effective in case of a malfunction as well. These test programs adversely affect the application programs running in the data-processing devices and slow down the effective operating speed of the computer system.

German Published Patent Application 34 31 169 discloses a method for synchronizing several parallel-working computers, in which each computer interrupts its program in response to a signal received from another computer indicating its synchronization readiness, and when the conditions are present for its part, it outputs a corresponding signal to all the other computers. Each computer begins with the processing of the next program step, after all computers of the computer system have signalled their synchronization readiness. Therefore, in this case, the processing speed of the fastest computer is adapted to that of the slowest computer of the multicomputer system. To prevent the situation from occurring in which the entire multicomputer system can no longer continue functioning after one computer fails, the computers also continue with their program when, in addition to their own synchronization-readiness signal, the corresponding signal from another computer is also available, and a certain specified minimum time has elapsed. However, no means are available for detecting and disconnecting an individual computer that has become out of synchronization with the other computers. In particular, this known device does not disclose, in case of a malfunction, means for severing the computer that is no longer reliably operational from the multicomputer system, in which the means for severing operate within the still operational computers.

The present invention is directed to the problem of developing a device for monitoring the synchronization in a multicomputer system consisting of parallel-working individual computers by evaluating the delay between synchronization-readiness signals that are produced by the various computers of the multicomputer system or their synchronization modules and that indicate the computer has reached a specified synchronization point. The present invention is also directed to the problem of developing such a device that severs a computer that does not output its synchronization-readiness signal within a specified time span after the device receives the synchronization-readiness signals from the other computers, and which device guarantees that a defective computer can be reliably detected and severed from the computer system, when the defective computer is unable to be synchronized with the remaining computers. The present invention is also directed to the problem of developing a device that performs the above stated functions without interrupting the performance of the application program in an undesirable manner. Finally, the present invention is directed to the problem of developing such a device in which when a single computer becomes unsynchronized, the remaining computers continue to operate in the two-out-of-two mode, and in which only when the unsynchronized computer is unable to be easily severed, is the computer system altogether disconnected for security reasons.

SUMMARY OF THE INVENTION

The present invention solves these problems by allocating to each computer a hardware-synchronization module, which is capable of being controlled by the clock signals of an internal clock-pulse generator, and which outputs the synchronization-readiness signals. The present invention also provides a first time monitoring device for each synchronization module. This first time monitoring device is capable of being controlled by means of the synchronization-readiness signals output from the synchronization modules allocated to the other computers. Upon expiration of the specified time span, the first time monitoring device directs a fault-storage means to disconnect at least those output gates of the allocated computer that are relevant to security, and to inject pseudo-synchronization-readiness signals on the common lines through which the other computers of the multicomputer system or rather their synchronization modules are informed of the synchronization readiness of the computer in question. The present invention also provides each synchronization module with two time monitoring devices, whose delay time is greater than that of the first time monitoring device. These two time monitoring devices are controllable by the corresponding synchronization module when a synchronization-readiness signal is emitted, as well as when the synchronization-readiness signals or the pseudo-synchronization-readiness signals from the other synchronization modules are received. Upon expiration of the delay time of these two time monitoring devices, which occurs independently of one another, these two time monitoring devices disconnect at least the output gates of the corresponding computer and of the synchronization module that are relevant to security.

By applying redundant time monitoring devices (or timeout facilities) to disconnect all the individual computers of the multicomputer system, computers that are unable to be synchronized can be reliably disconnected. An additional time monitoring device set to a shorter monitoring time ensures that, if a single computer fails, the other time monitoring devices of the other computers do not function in response to an actuation, and that the computer system can continue to function while excluding the defective computer. This is achieved in that this further time monitoring device compulsorily switches the output signals from the failed individual computer into the "ready for synchronization" setting. When the defective time monitoring device fails, the redundant time monitoring device of the other computers causes the computer system to be reliably disconnected.

To guarantee that the computer system is reliably disconnected in case of a malfunction, the present invention provides for the redundant time monitoring device to act in different ways on the process, when necessary, so that even when the circuit element controlled by one of these time monitoring devices fails, the process can still be reliably affected.

Adjusting the time monitoring devices, by means of which a computer is supposed to be severed from the computer system, when necessary, is made dependent in accordance with the teaching of the present invention upon the existence of appropriate control signals from the still operational computers, or rather from the synchronization modules allocated to these computers. This ensures that, even when one computer is completely inoperative, the computers that are still operating can reliably cut off the failed computer.

The present invention also provides that the control signals, which come from the other computers and which adjust the time monitoring devices in the synchronization modules, are fed via OR elements. These OR elements can be switched into an active state, when needed, by the corresponding computer. When the computer activates the OR elements, as soon as the computer receives an indication that another computer has failed in the multicomputer system, it is then possible in accordance with the present invention for the defective computer to be severed from the multicomputer system so that it can be serviced. This can be done without creating interfering signals on the link circuits that unintentionally adjust the time monitoring devices in the synchronization modules of the still intact computers.

According to the teaching of the present invention, the design of the control outputs of the synchronization module must be such that they are decoupled from the control inputs of the other synchronization modules, to rule out unintentional conducted interference.

To simplify the service measures, the present invention provides for arranging means for optically characterizing the operating states of at least a few of the discrete components on the synchronization modules. Thus, for example, the response of the time monitoring devices or the adjustment of the fault storage means can be marked there.

The computer of the multicomputer system is synchronized often enough when, according to the teaching of the present invention, specific control signals, which are being applied to the computer buses, initiate the synchronization processes.

To prevent the multicomputer system from being disconnected upon initial start up or upon re-start because it is unable to be synchronized within the specified times, the present invention provides for the time monitoring devices to be switched into an inactive state for a certain time.

BRIEF DESCRIPTION OF THE DRAWING

The single drawing shows a secure two-out-of-three computer system consisting of three computers MCA through MCC, whose individual computers have identical hardware and process identical data in parallel using identical software, which computer system operates according to the present invention.

DETAILED DESCRIPTION

In a manner not shown in the figure, three computers MCA, MCB and MCC continually compare data being applied to their buses to check for conformity via monitoring channels of a dual design running among the computers. When the data of one computer deviates from that of the remaining computers, the computer detects this deviation from the data comparison and uncouples itself from the computer system by severing its connection, at least to the process interface system that is relevant to security. In addition this connection is also interrupted via the monitoring channels. The secure multicomputer system, which up to this point has been working as a two-out-of-three system, then continues to work as a two-out-of-two system, reliably from a standpoint of signal engineering. This continues until the failed computer is repaired and phased back into the multicomputer system. The drawing does not depict the circuit elements, through which the process interface system to be controlled by the multicomputer system receives signals from the computers.

Each of the individual computers MCA through MCC has its own clock-pulse generator (not shown), which supplies clock signals for data processing, data transmission, and data comparison. These clock-pulse generators are preferably quartz-crystal-controlled; their clock frequency lies in the order of magnitude of, for example, 10 MHz, and the quartz accuracy at about $10^{-4}$/s. This means that the clock pulses of the three clock-pulse generators can deviate from one another every second by up to 1000 Hz. It follows from this that the three computers, although they process the same controlling tasks according to the same program, they do not necessarily do this at exactly the same time, but rather more or less in staggered intervals. A comparison to check for conformity then turns out to be negative. Problems also occur when data are phased into the computers, and then the computers read in these data at different clock-pulse steps of their program. Thus one computer could already be reading in the data, while another is still waiting to do this. This would mean that different data are being applied—even if only temporarily—to the computers. To guarantee a sufficiently precise synchronization of the computers when reading in the data and during the data comparison, it is necessary for the three computers to be continually synchronized by means of WAIT cycles and, in fact, given the accepted parameters, within a time interval of less than 1 ms. In the case of one concrete refinement of the multicomputer system, one starts out from a reciprocal synchronization in the order of magnitude of about 10 $\mu$s. The synchronization process is initiated by the individual computers of the computer system when peripheral data are read in and out and when certain memory-read cycles are performed. These are the control signals IOW, IOR and MEMS, whereby only every second or third memory-read signal MEMS is supposed to initiate the synchronization process. The rate of occurrence of these control signals is such that the desired synchronization cycle time of about 10 $\mu$s is achieved. As a result of the synchronization process, the program processing of the various computers rum two clock pulses apart from one another, at the most. This slight offset of the program processing allows the data existing on the internal computer buses to be mutually compared for conformity, in each case during the synchronization phase.

The three computers of the multicomputer system are synchronized via hardware-synchronization modules BGA through BGC situated outside of the computers. These hardware-synchronization modules are designed so that in case of need, namely when a computer is unable to be synchronized with the remaining computers, these hardware-synchronization modules cause the computer that has become unsynchronized to be severed from the computer system. This severing operation is initiated by the synchronized computers and the defective computer is unable to influence the severing operation, i.e., the defective computer cannot prevent itself from being cut off. Severing a computer does not necessarily have to be occur by disconnecting the computer by interrupting its current supply. Rather, in case of a malfunction, it is sufficient to disconnect only those output gates of the defective computer that are relevant to security, so that this computer is unable to cause danger. At the same time, test programs can attempt to discover the reason for the malfunction that has occurred, so that repair of the defective computer can begin as soon as possible.

When the computers arrive in the program processing at a synchronization point defined by the previously mentioned control signals, then a hardware control StA, StB or StC temporarily halts further execution of the program on the synchronization modules BGA through BGC by not setting READY signals, whereby the last command to be executed is quasi frozen. The hardware control StA, StB or StC via output amplifiers VA, VB or VC causes synchronization-readiness signals SYA, SYB or SYC to be injected on the link circuits leading to the other synchronization modules. The synchronization-readiness signals from the corresponding partner computers are gated in pairs in the synchronization modules of the computers and in AND gates UA, UB, or UC, and cause hardware time monitoring devices ZUA1 to ZUA3, ZUB1 to ZUB3, or ZUC1 to ZUC3 to be adjusted there. Each synchronization module evaluates the synchronization-readiness signals being received and causes the program processing to be continued by injecting a READY signal, when the synchronization-readiness signals from all three computers are received. This occurs simultaneously in the case of all synchronization modules and is triggered by the slowest clock-pulse generator of the computers to be synchronized. However, if this clock-pulse generator is so slow that a synchronization process is unable to be performed within a specified maximum time or if, because of a malfunction, one of the computers processes a different program sequence than the other computers, then the synchronization modules of these computers cause the unsynchronized computer to be severed from the computer system. To this end, the synchronization-readiness signals from the still intact computers adjust, inter alia, the time monitoring device ZUA3 in the synchronization module of the computer to be severed, for instance of the computer MCA. The delay time of this time monitoring device is selected to correspond to the maximum permissible time delay of the program processing of this computer compared to those of the other computers. In case the computer MCA is unable to be synchronized, the time monitoring device ZUA3 adjusts a fault storage means FSA, which emits a disconnect signal ASA for severing from the computer MCA the process interface system, which is relevant to security. The time monitoring device ZUA3 makes this adjustment after the expiration of a period of time of, for example, 3 $\mu$s, that is about 30 cycle times from the time that the synchronization readiness is signalled by the other synchronization modules. At the same time, the synchronization module BGA causes the pseudo-synchronization-readiness signals SYA, which are simulating the synchronization readiness of the disconnected computer MCA, to be injected on to the link circuits leading to the other synchronization modules. Thus, the computer system can continue to be reliably operated from a standpoint of signal engineering in the two-out-of-two mode after the failure of the computer MCA. The pseudo-synchronization-readiness signals output by the synchronization module of the failed computer allow the synchronization process in the synchronization modules of the controlling computers to operate independently of the synchronization module allocated to the failed computer, i.e., the synchronization module allocated to the failed computer no longer participates in the synchronization of the remaining synchronization modules. In the case of a failed computer MCA, the input of the AND gate UB at the top of the drawing and the input of the AND gate UC at the bottom of the drawing are constantly influenced by the pseudo-synchronization-readiness signal SYA coming from this synchronization module, so that the AND gate in question is activated when the synchronization-readiness signal is available from the partner computer that is still available at the time, and it adjusts the time monitoring device in the two synchronization modules BGB and BGC. Corresponding processes follow when the computers MCB or MCC are unable to be synchronized, whereby the corresponding synchronization modules generate corresponding disconnect signals ASB or ASC for the output gates leading to the process interface system.

Usually, only very few clock signals are needed to synchronize the computers of a multicomputer system, so that, altogether, only a small percentage of the available computer time is needed for the ongoing synchronization. One of the time monitoring devices ZUA3 to ZUC3 responds only by way of exception and causes the corresponding computer to be disconnected.

To ensure that, in case of need, these time monitoring device actually react in a manner appropriate to their tasks, one could subject them to a performance check through test programs. However, this would make it necessary to interrupt the application program running at the time and would cost computer time. For this reason, in addition to the first time monitoring device ZUA3 to ZUC3, the synchronization modules have additional time monitoring devices ZUA2 to ZUC2, which are adjusted, together with the first time monitoring device, by means of the corresponding control. The delay time of these additional time monitoring devices is greater than that of the first time monitoring device. Thus, assuming proper functioning performance, it is ensured that a first time monitoring device ZUA3 can respond, before the additional time monitoring device ZUB1, ZUB2, ZUC1, ZUC2 of the other computers respond. The multicomputer system would be altogether disconnected when this time monitoring device responds. These time monitoring devices had been previously adjusted when the synchronization-readiness signal was emitted by the synchronization module in question.

For reasons of security, two time monitoring devices ZUA1, ZUA2 or ZUB1, ZUB2 or ZUC1, ZUC2 are provided for each synchronization module. When actuated, these time monitoring devices block the output gates of the computer that are relevant to security and are affected by the malfunction, independently of one another and in different ways. While the time monitoring device ZUA2 of the synchronization module BGA outputs a disconnect signal ASA via the output of the fault storage means FSA for the output gates of the process interface system that are relevant to security, and via the output of the computer MCA, by way of the control StA, the time monitoring device ZUA1 causes the synchronization stop to be abandoned and the output gates leading to the computer interface system to be disconnected by means of the computer MCA as the result of an interrupt NMI, which is unable to be masked, to the computer MCA. If a synchronization process occurs after the time monitoring devices are adjusted within their established delay times, then the corresponding control causes the time monitoring devices to be reset and initiates the program start by way of the READY control.

While the additional time monitoring devices are present exclusively for reasons of security and limit the waiting time of the computers to one synchronization process, as well as act as a fault detector, for the corresponding first time monitoring devices, the first time monitoring devices increase the reliability of operation of the computer system. This is because they are supposed to become effective when one computer is unable to be synchronized and, by means of the pseudo-synchronization-readiness signals, they make it possible for the program processing to be continued in the remaining two-out-of-two computer systems.

To facilitate the servicing of the computer system, it is advantageous to provide the synchronization modules with means for optically characterizing the operating states of at least a few of their components. Thus, for example, from the characterization of the operating state of the time monitoring devices or of the fault-storage means, a statement can be made about which computer was cut off and through which means it was cut off. The serviceability of the computer system can still be further improved by having the computers generate control signals SA1, SA2 or SB1, SB2 or SC1, SC2 each time an inoperative computer is detected. Via corresponding OR gates OA1, OA2 or OB1, OB2 or OC1, OC2, these control signals mask those inputs of their AND gates UA through UC, to which the synchronization-readiness signal or pseudo-synchronization-readiness signal coming from the failed computer must be fed. This prevents synchronization attempts from being unintentionally initiated by interference effects on the open inputs of the AND gate, when the modules of one computer are withdrawn or when a synchronization module is withdrawn. In some instances, such unintentional synchronization attempts could cause the entire computer system to be disconnected. Thus, the individual computers generate the pseudo-synchronization signals coming from the synchronization module of the failed computer, by themselves, and, in this manner, make themselves completely independent from further participation of this computer, or rather of its synchronization module. To restart the computer system in the two-out-of-three mode, the control signals of the computers which switch through the AND gates must, of course, be reset again. To this end, a software synchronization must initially follow, which allows the programs of the individual computers to be pre-synchronized to an accuracy of a few ten program cycles and to subsequently undergo a precision synchronization through the synchronization modules, as clarified in detail above.

I claim:

1. An apparatus for monitoring synchronization of a plurality of parallel-working individual computers in a multicomputer system, in which each of said computers has a plurality of security relevant output gates coupled to a device that might be impacted by a malfunction in said each computer said apparatus comprising:
   a) a plurality of lines; and
   b) a plurality of synchronization modules being coupled together by said plurality of lines, one such module being provided for each of said plurality of computers, each synchronization module outputting a synchronization-readiness signal to other synchronization modules of said plurality of synchronization modules via said plurality of lines, wherein each synchronization module outputs the synchronization-readiness signal when a specifiable synchronization point has been reached in an associated computer of the plurality of parallel-working individual computers, which associated computer is associated with said each synchronization module, each of said synchronization modules including:
      (i) an internal clock-pulse generator;
      (ii) a first time monitoring device being responsive to a first plurality of synchronization-readiness signals from others of said plurality of synchronization modules, and detecting whether the associated computer produces a control signal within a first predetermined time measured from when the first time monitoring device receives a synchronization-readiness signal from one of the other synchronization modules;
      (iii) a fault-storage means being set by said control signal, disconnecting at least those security relevant output gates of the associated computer and injecting a pseudo synchronization-readiness signal on the plurality of lines to the other synchronization modules, if said first predetermined time expires;
      (iv) a second time monitoring device being responsive to the control signal from the associated computer and the synchronization-readiness signals of the other synchronization modules, and causing the security relevant output gates of the associated computer to be disabled after a second predetermined time expires, wherein said second predetermined time is greater than said first predetermined time; and
      (v) a third time monitoring device being responsive to the control signal from the associated computer and the synchronization-readiness signals of the other synchronization modules, and said third time monitoring device disabling the security relevant output gates of the associated computer after a third predetermined time expires, wherein said third time monitoring device operates independently of said second time monitoring device, and said third predetermined time is greater than said first predetermined time.

2. The apparatus according to claim 1, further comprising first means for disabling the security relevant output gates being controlled by said second time monitoring device, and second means for disabling the security relevant output gates being controlled by the third time monitoring device.

3. The apparatus according to claim 1, wherein said first time monitoring device further comprises a control input, said second time monitoring device further comprises a control input, said third time monitoring device further comprises a control input, and each synchronization module further comprises an AND gate, said AND gate having a first plurality of inputs receiving the first plurality of synchronization-readiness signals and the first plurality of pseudo-synchronization-readiness signals of the other synchronization modules, and having an output being coupled to the control inputs of said first, second and third time monitoring devices.

4. The apparatus according to claim 3, wherein said AND gate further comprises a second plurality of inputs, each synchronization module further comprises a plurality of OR gates having a plurality of outputs coupled to the second plurality of inputs of the AND gate, each of said plurality of OR gates having a first input receiving the first plurality of synchronization-readiness signals or the first plurality of pseudo-synchronization-readiness signals of the other synchronization units respectively, and each of said plurality of OR gates having a second input receiving a control signal being generated by the associated computer.

5. The apparatus according to claim 1, wherein each of said synchronization modules further comprises a control input and a control output, wherein the control output of the synchronization module is decoupled from the control inputs of the other synchronization modules.

6. The apparatus according to claim 1, wherein each of said plurality of synchronization modules further comprises means for optically characterizing a current operating state of that synchronization module by switching on and off light emitting elements, wherein the operating state includes information regarding discrete components of that synchronization module.

7. The apparatus according to claim 1, wherein when the multicomputer system is started or restarted, functioning of the first, second and third time monitoring devices is inhibited for a specifiable number of synchronization cycles by generating the pseudo-synchronization-readiness signals.

8. A multicomputer system comprising:
   a) a plurality of parallel-working individual computers, each of said plurality of parallel-working individual computers having a plurality of security relevant gates that are coupled to a device that might be impacted by a malfunctioning said each computer;
   b) an apparatus for monitoring synchronization of said plurality of parallel-working individual computers, said apparatus including:

(i) a plurality of lines; and (ii) a plurality of synchronization modules being coupled together by said plurality of lines, one such module being provided for each of said plurality of computers, each synchronization module outputting a synchronization-readiness signal to other synchronization modules of said plurality of synchronization modules via said plurality of lines, wherein each synchronization module outputs the synchronization-readiness signal when a specifiable synchronization point has been reached in an associated computer of the plurality of parallel-working individual computers, which associated computer is associated with said each synchronization module, each of said synchronization modules including:

(a) an internal clock-pulse generator;

(b) a first time monitoring device being responsive to a first plurality of synchronization-readiness signals from others of said plurality of synchronization modules, and detecting whether the associated computer produces a control signal within a first predetermined time measured from when the first time monitoring device receives a synchronization-readiness signal from one of the other synchronization modules;

(c) a fault-storage means being set by said control signal, disconnecting at least the security relevant output gates of the associated computer and injecting a pseudo synchronization-readiness signal on the plurality of lines to the other synchronization modules, if said first predetermined time expires;

(d) a second time monitoring device being responsive to the control signal from the associated computer and the synchronization-readiness signals of the other synchronization modules, and disabling the security relevant output gates of the associated computer after a second predetermined time expires, wherein said second predetermined time is greater than said first predetermined time; and (e) a third time monitoring device being responsive to the control signal from the associated computer and the synchronization-readiness signals of the other synchronization modules, and said third time monitoring device disabling the security relevant output gates of the associated computer after a third predetermined time expires, wherein said third time monitoring device operates independently of said second time monitoring device, and said third predetermined time is greater than said first predetermined time.

9. The multicomputer system according to claim 8, wherein the first time monitoring, device has a control input, the second time monitoring device has a control input, the third time monitoring device has a control input, each of said plurality of synchronization modules further comprises an AND gate, said AND gate having a first plurality of inputs receiving the first plurality of synchronization-readiness signals or the first plurality of pseudo-synchronization-readiness signals of the other synchronization modules, having an output being coupled to the control inputs of said first, second and third time monitoring devices, and having a second plurality of inputs.

10. The multicomputer system according to claim 9, wherein each of said AND gates further comprises a second plurality of inputs, each of said plurality of synchronization modules further comprises a plurality of OR gates having outputs coupled to the second plurality of inputs of the AND gate, each of said plurality of OR gates having a first input receiving one of the first plurality of synchronization-readiness signals or one of the first plurality of pseudo-synchronization-readiness signals of the other synchronization modules, and each of said plurality of OR gates having a second input receiving a control signal being injected by the associated computer, whereby the associated computer detects when a second computer of the plurality of computers has failed by performing a data comparison and, as a result, acts upon said plurality of OR gates that read in a particular synchronization-readiness signal from a particular synchronization module of said plurality of synchronization modules that is allocated to said second computer so that said particular synchronization-readiness signal is inhibited from affecting the output of said AND gate, until said second computer is again integrated into the multicomputer system.

11. The multicomputer system according to claim 8, wherein each of said plurality of synchronization modules further comprises means for optically characterizing a current operating state of that synchronization module by switching on and off light emitting elements, wherein the operating state includes information regarding discrete components of that synchronization module.

12. The multicomputer system according to claim 8, wherein when the multicomputer system is started or restarted, functioning of the first, second and third time monitoring devices is inhibited for a specifiable number of synchronization cycles by generating the pseudo-synchronization-readiness signals.

13. A method for synchronizing a plurality of parallel-working individual computers in a multicomputer system, in which each of the plurality of parallel-working individual computers has a plurality of security relevant output gates coupled to a device that might be impacted by a malfunction in said each computer said method comprising the steps of:

a) allocating a synchronization module to each computer of the plurality of parallel-working individual computers;

b) outputting a first synchronization-readiness signal from a first synchronization module allocated to a first computer of the plurality of computers to other synchronization modules that are allocated to others of the plurality of computers upon receipt of a first control signal from the first computer, wherein the first control signal, and thus the synchronization-readiness signal, indicate that a specifiable synchronization point has been reached in said first computer;

c) disconnecting at least the plurality of security relevant output gates of the first computer by using a first timeout device when a first predetermined time expires in which a first plurality of synchronization-readiness signals from the other synchronization modules are received by the first synchronization module but the first control signal from the first computer is not received by the first synchronization module; and d) injecting a pseudo-synchronization-readiness signal from the first synchronization module on lines interconnecting the other synchronization modules, if the first predetermined time expires.

14. The method according to claim 13, further comprising the steps of:
  e) disconnecting the plurality of security relevant output gates of the first computer with a second timeout device when a second predetermined time expires that is greater than the first predetermined time;
  f) controlling a control input of the second timeout device with the synchronization-readiness signal emitted from that synchronization module allocated to the first computer, when the first plurality of synchronization-readiness signals are received by that synchronization module or when the first plurality of pseudo-synchronization-readiness signals from said other synchronization modules are received by that synchronization module;
  g) disconnecting the security relevant output gates with a third timeout device when a third predetermined time expires that is greater than the first delay time; and
  h) controlling a control input of the third timeout device with the synchronization-readiness signal emitted from that synchronization module allocated to the first computer, when the first plurality of synchronization-readiness signals are received by that synchronization module or when the first plurality of pseudo-synchronization-readiness signals from the other synchronization modules are received by that synchronization module.

15. The method according to claim 14, further comprising the step of:
  i) controlling the control inputs of the second and third timeout devices with the output of an AND gate, wherein the AND gate has a first input receiving the first plurality of synchronization-readiness signals or the first plurality of pseudo-synchronization-readiness signals.

16. The method according to claim 15, further comprising the steps of:
  j) controlling a plurality of inputs of the AND gate with a plurality of OR gates corresponding in number to one less than a number of the synchronization modules, wherein each of the plurality of OR gates have a first input receiving one of the first plurality of synchronization-readiness signals or one of the first plurality of pseudo-synchronization-readiness signals, and each of the plurality of OR gates having a second input receiving a control signal being injected by the allocated computer; and
  k) inhibiting a particular synchronization-readiness signal from a particular synchronization module allocated to a second computer of the plurality of parallel-working individual computers from affecting the output of the AND gate in that synchronization module allocated to the first computer, when the first computer detects that the second computer has failed by performing a data comparison and then acting upon said plurality of OR gates that read in the particular synchronization-readiness signal, until the second computer is again integrated into the multicomputer system.

17. The method according to claim 13, further comprising the step of: inhibiting functioning of the first, second and third timeout devices for a specifiable number of synchronization cycles when the multicomputer system is started or restarted, after generating the pseudo-synchronization-readiness signal.

* * * * *